Figure 1:
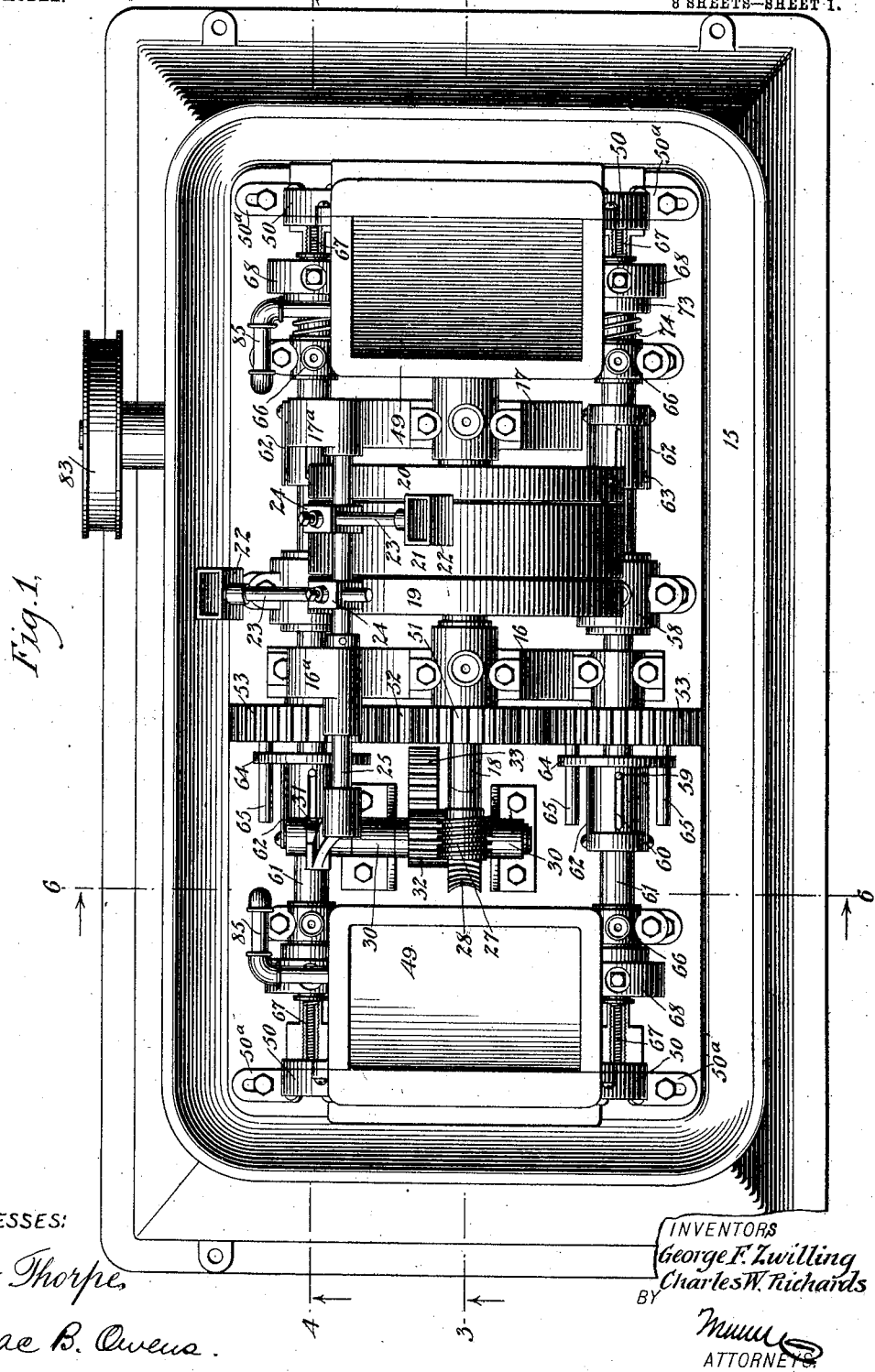

No. 768,503. PATENTED AUG. 23, 1904.
G. F. ZWILLING & C. W. RICHARDS.
NUT TAPPING MACHINE.
APPLICATION FILED JUNE 12, 1903.
NO MODEL. 8 SHEETS—SHEET 1.

WITNESSES:
Edw. Thorpe,
Isaac B. Owens.

INVENTORS
George F. Zwilling
Charles W. Richards
BY
ATTORNEYS

No. 768,503. PATENTED AUG. 23, 1904.
G. F. ZWILLING & C. W. RICHARDS.
NUT TAPPING MACHINE.
APPLICATION FILED JUNE 12, 1903.
NO MODEL. 8 SHEETS—SHEET 3.

WITNESSES:
Edward Thorpe.
Isaac B. Owens.

INVENTORS
George F. Zwilling
Charles W. Richards
BY
Munn
ATTORNEYS.

No. 768,503. PATENTED AUG. 23, 1904.
G. F. ZWILLING & C. W. RICHARDS.
NUT TAPPING MACHINE.
APPLICATION FILED JUNE 12, 1903.
NO MODEL. 8 SHEETS—SHEET 6.

WITNESSES:
Edw. Thorpe.
Isaac B. Owens.

INVENTORS
George F. Zwilling
Charles W. Richards
BY
ATTORNEYS.

No. 768,503. PATENTED AUG. 23, 1904.
G. F. ZWILLING & C. W. RICHARDS.
NUT TAPPING MACHINE.
APPLICATION FILED JUNE 12, 1903.
NO MODEL. 8 SHEETS—SHEET 7.

WITNESSES:
Edw. Thorpe.
Isaac B. Owens.

INVENTORS
George F. Zwilling
Charles W. Richards
BY
Munn
ATTORNEYS.

No. 768,503.

Patented August 23, 1904.

UNITED STATES PATENT OFFICE.

GEORGE F. ZWILLING AND CHARLES W. RICHARDS, OF CLEVELAND, OHIO, ASSIGNORS TO ACME MACHINERY COMPANY, OF CLEVELAND, OHIO.

NUT-TAPPING MACHINE.

SPECIFICATION forming part of Letters Patent No. 768,503, dated August 23, 1904.

Application filed June 12, 1903. Serial No. 161,181. (No model.)

*To all whom it may concern:*

Be it known that we, GEORGE F. ZWILLING and CHARLES W. RICHARDS, citizens of the United States, and residents of Cleveland, in the county of Cuyahoga and State of Ohio, have invented a new and Improved Nut-Tapping Machine, of which the following is a full, clear, and exact description.

This invention relates to a machine for automatically threading nuts; and the prime object of the invention is to produce a machine in which the tapping operations are practically continuous, thus greatly increasing the speed of the machine.

This specification is an exact description of one example of our invention, while the claims define the actual scope thereof.

The organized machine as here illustrated may be outlined as follows: On the frame of the machine are mounted two shafts having means for revolving and simultaneously reciprocating them, these means including devices for automatically reversing the direction of revolution. At each end of each shaft is arranged a peculiar chuck and relief device, the chucks carrying the taps and the relief devices permitting the parts to give should the taps encounter extraordinary obstacles. Moving with said shafts are peculiarly-constructed ejectors, which displace the finished products, and driven in time with the devices for driving the said shafts are the feeding-slides, which deliver the blank nuts to four chutes arranged over the respective taps. The shafts carrying the taps are reciprocated simultaneously toward and from the respective ends of the machine, and therefore two taps are always at work at one end while the other taps at the opposite end are in the act of unscrewing from the finished nuts. The taps act continuously, therefore, to screw into and unscrew from the blanks, and the feeding devices supply the blanks to the taps as fast as the blanks can be operated upon. This produces a continuously-operating and exceedingly-fast machine in which there is no stoppage of the active operating movements of the taps.

Reference is to be had to the accompanying drawings, forming a part of this specification, in which similar characters of reference indicate corresponding parts in all the views.

Figure 2:
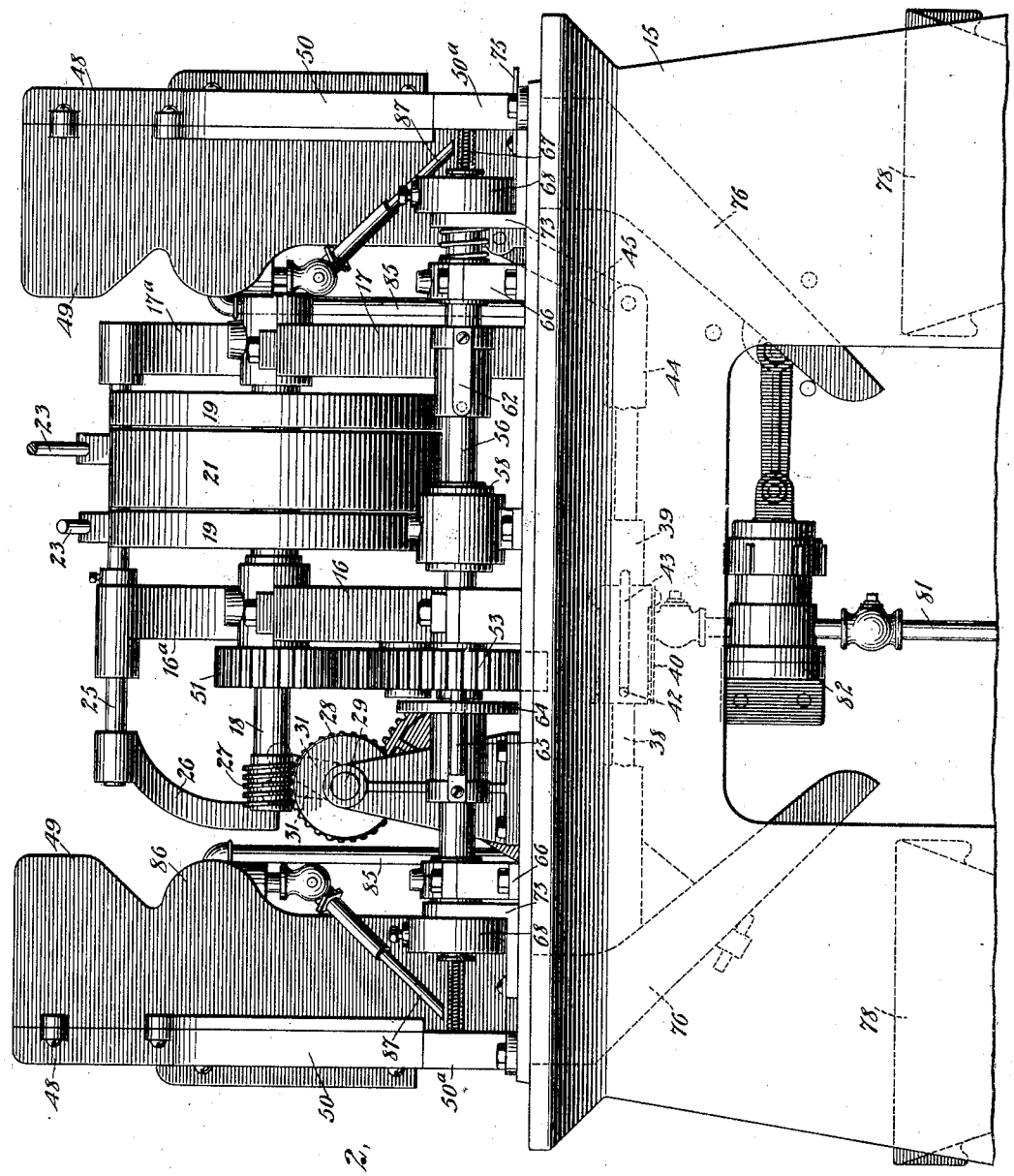
Figure 3:
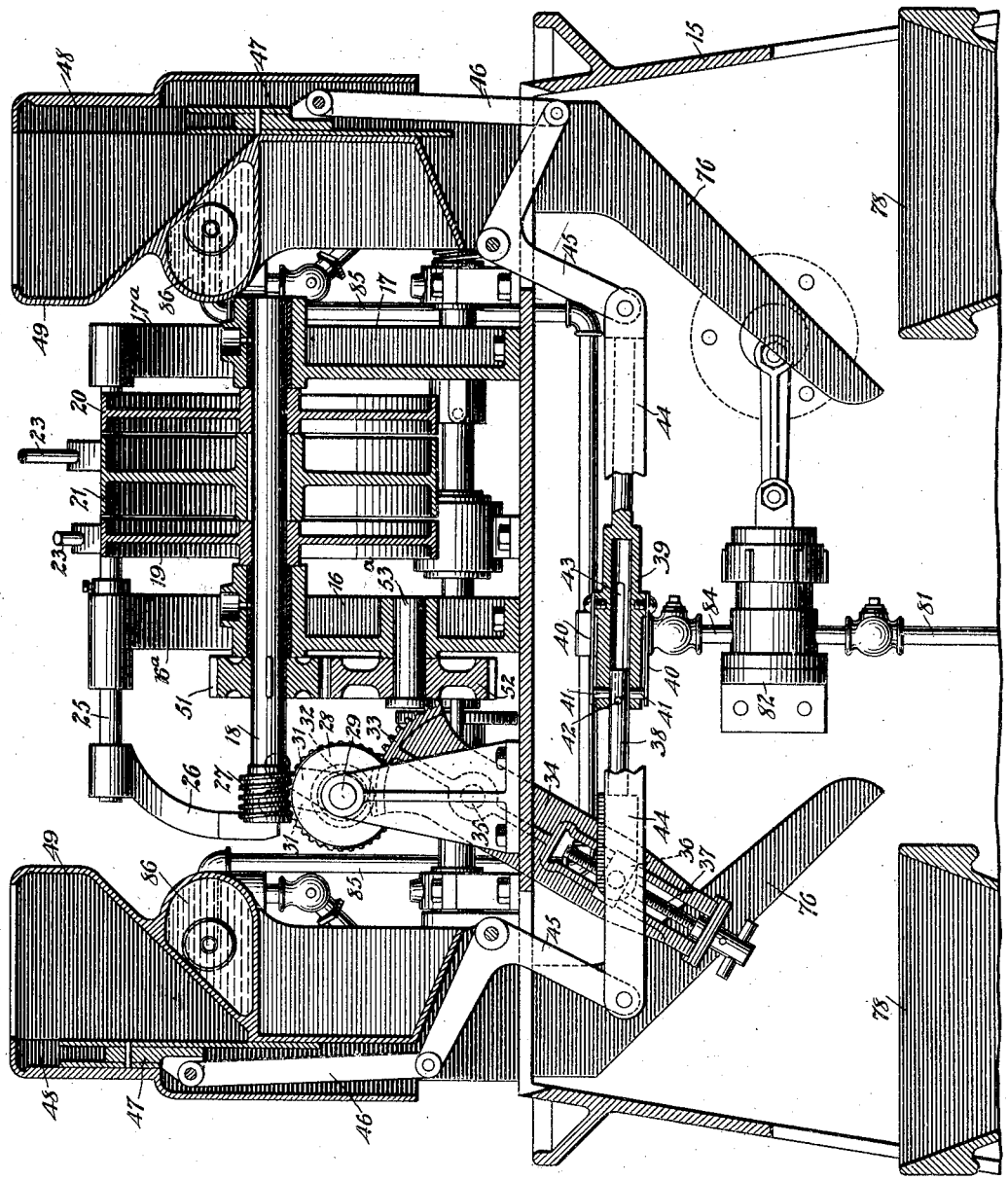
Figure 4:
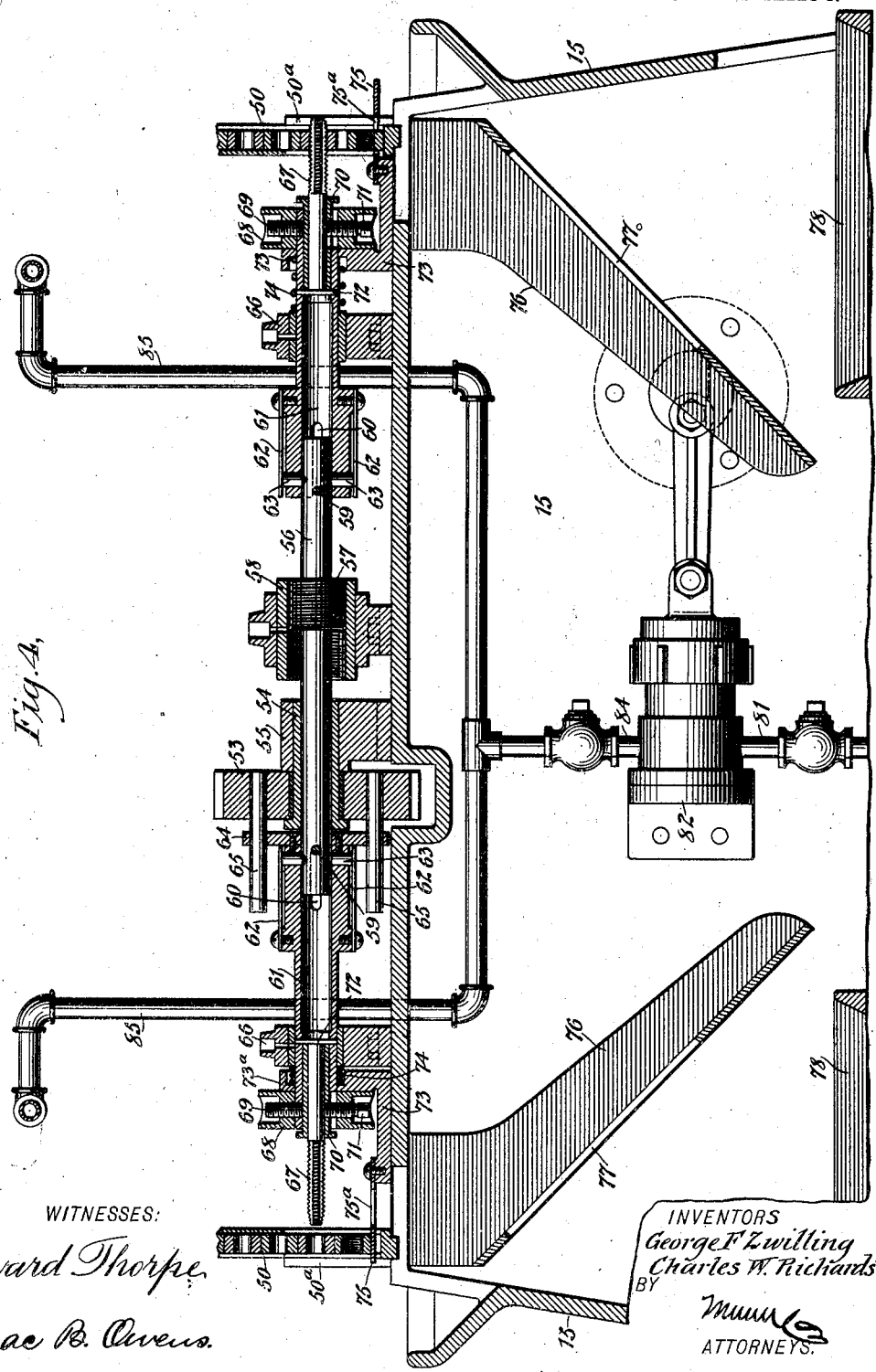
Figure 5:
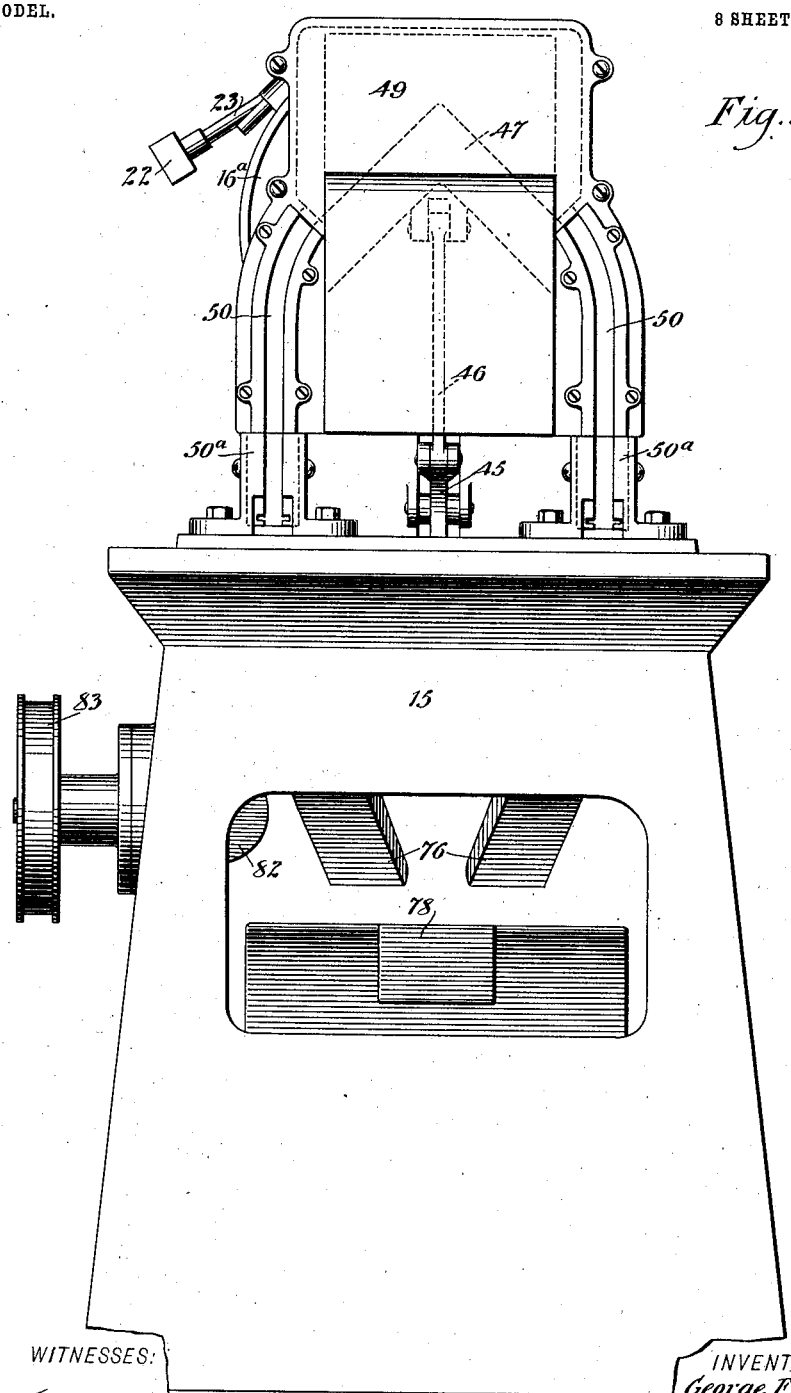
Figure 6:
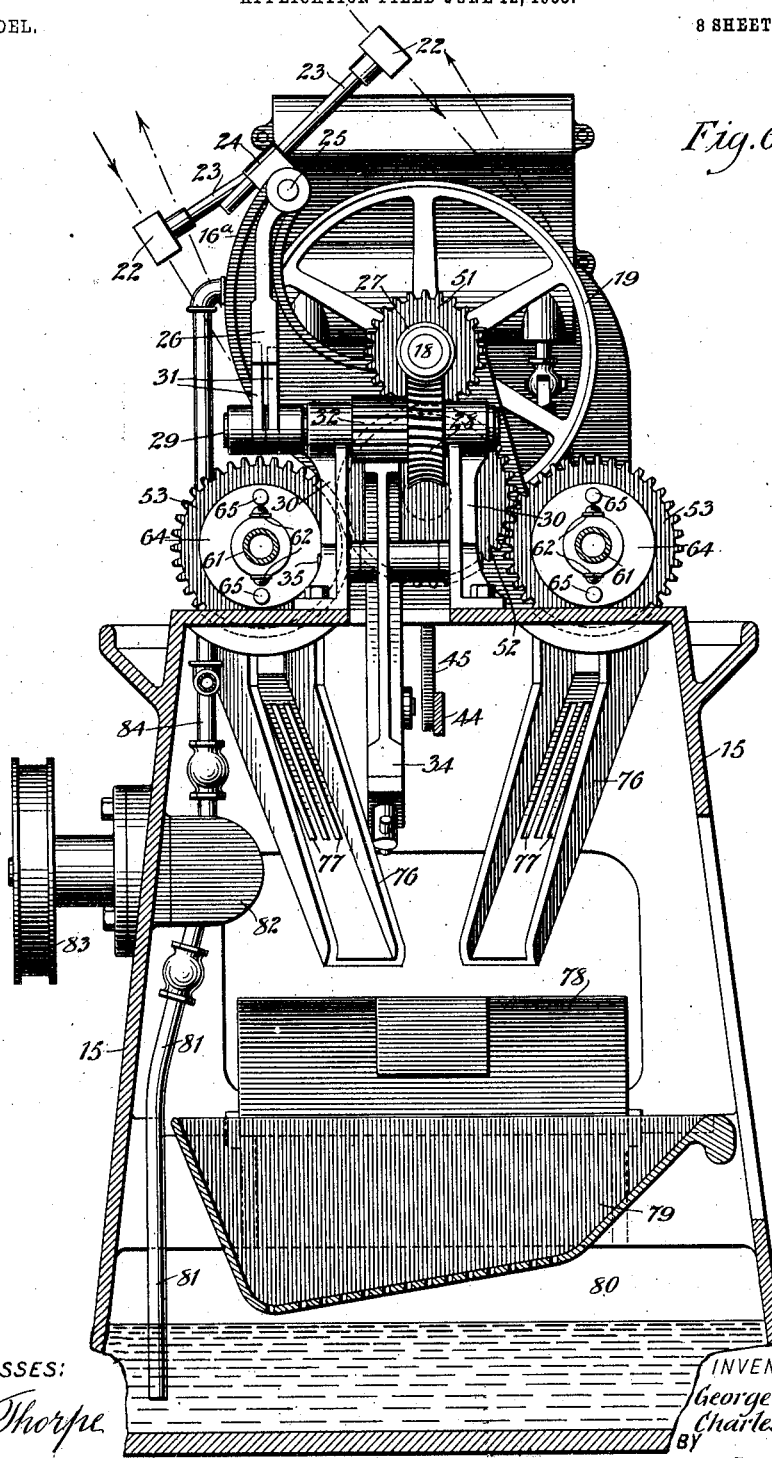
Figure 7:
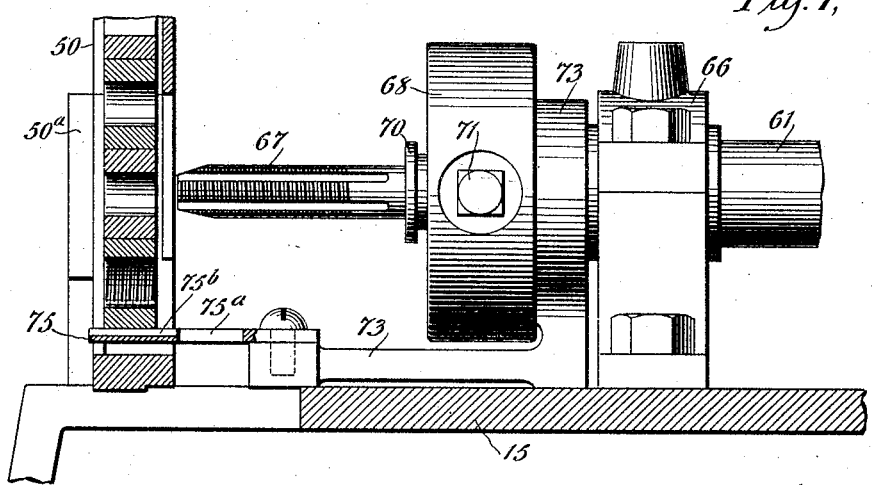
Figure 8:
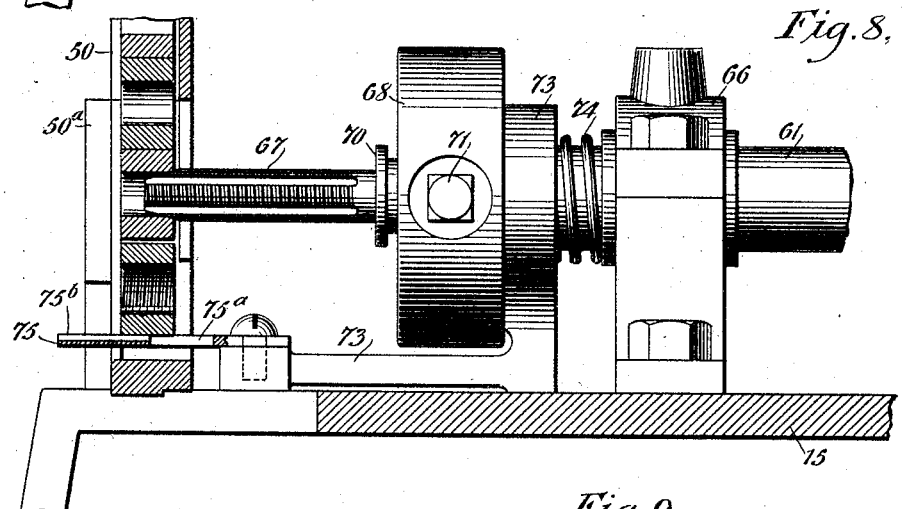
Figure 9:
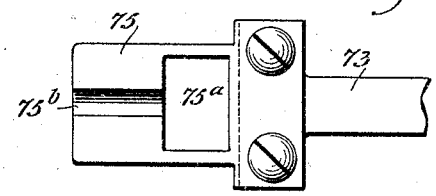
Figure 10:
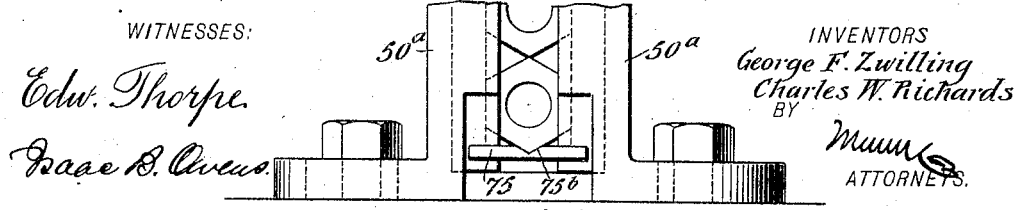
Figure 11:
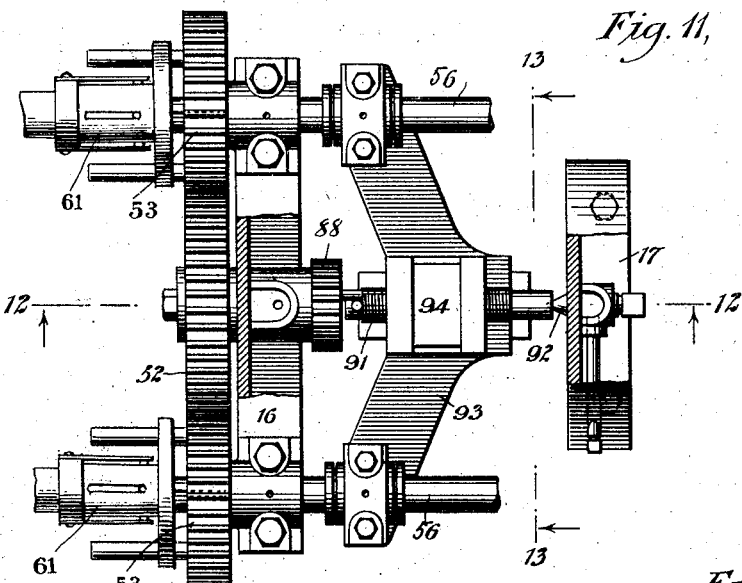
Figure 12:
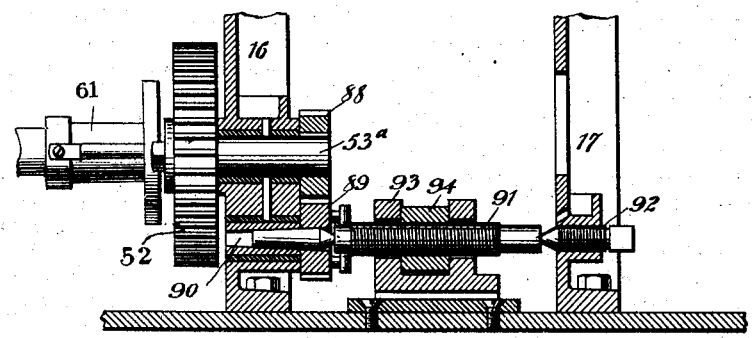
Figure 13:
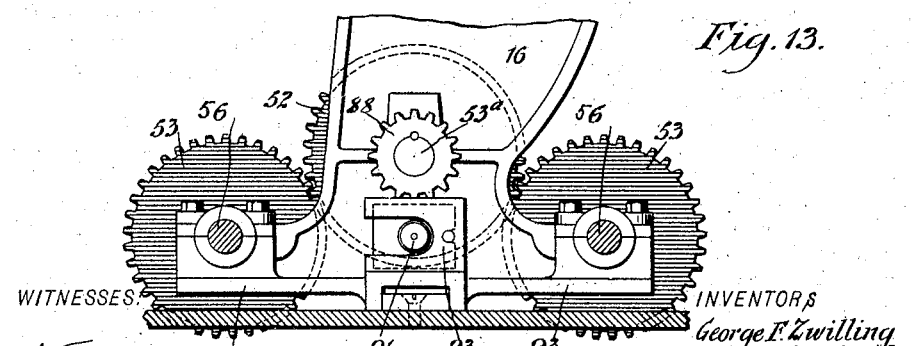

Figure 1 is a plan view of the machine. Fig. 2 is a side elevation thereof. Fig. 3 is a longitudinal section on the line 3 3 of Fig. 1. Fig. 4 is a longitudinal section on the line 4 4 of Fig. 1. Fig. 5 is an end elevation showing particularly the chutes through which the blanks are fed. Fig. 6 is a cross-section on the line 6 6 in Fig. 1. Fig. 7 is an enlarged detail view showing the relation of the taps to the blanks prior to the engagement between the two. Fig. 8 is a similar view showing the tap engaged with the appropriate blank. Fig. 9 is a detail plan view of the ejector suited both to square and hexagonal nuts. Fig. 10 is an enlarged front view of the ejector with the parts adjacent thereto and showing the ejector operating in connection with the hexagonal nuts. Fig. 11 is a plan view of a modification of the lead-screw. Fig. 12 is a section on the line 12 12 of Fig. 11, and Fig. 13 is a sectional elevation on the line 13 13 of Fig. 11.

The base 15 of the machine carries pedestals 16 and 17, (see Fig. 3,) and in these pedestals is mounted to revolve the prime-movement shaft 18. This shaft has two loose pulleys 19 and 20 thereon and a single double-faced fixed pulley 21 located between the pulleys 19 and 20. Reversely-moving driving-belts are adapted to operate with these pulleys, (see Fig. 6,) and said belts are engaged by guides 22, carried on arms 23, fastened by clamps 24 to a shipper-shaft 25, which is mounted to slide longitudinally in extensions $16^a$ and $17^a$ of the pedestals 16 and 17. One end of the shipper-shaft 25, outside of the bearings thereof, is provided with a downwardly-extending arm 26, which coacts with the devices for operating the shaft 25, as will be hereinafter fully set forth. The belt-holders 22 are so arranged that upon the reciprocal movement of the shaft 25 one of the belts is thrown onto the fast pulley 21, the other belt being simultaneously thrown onto its corresponding loose pulley. Consequently by the action of the shaft 25 the shaft 18 is driven first in one direction and then in the other.

On the left-hand end of the shaft 18 (see Fig. 3) is fastened a worm 27, this worm meshing with a worm-wheel 28, fastened to a short transverse shaft 29, carried in pedestals 30, rising from the base 15. One end of said shaft 29 outside of the shaft-bearings has two adjustably-mounted arms 31, which are located just under the downwardly-projecting arm 26 of the shipper-shaft 25. As the shaft 29 turns one of said arms 31 engages the arm 26 and throws the shaft 25 in one direction, thus reversing the direction of movement of the shafts 18 and 29. These elements continue to turn in the reverse direction until the other arm 31 strikes the opposite side of the arm 26, and the shaft 25 is thrown back to its first position, whereupon the direction of revolution is again reversed.

Fastened to the shaft 29 alongside of the worm 27 is a pinion 32, which is in mesh with a toothed sector 33, formed on a lever 34, mounted to rock around the intermediate fulcrum, (indicated at 35,) said fulcrum consisting of a pin mounted between the before-mentioned pedestals 30. The lever 34 projects downward below the table of the machine and has its lower end slotted to receive a slide 36, which is adjustable longitudinally of the lever by means of a screw 37. To this slide is pivoted a link 38, and it is clear that by adjusting the slide 36 the throw of the lever of the link 38 may be regulated at will. The link 38 is formed in two sections, and these sections are joined by a yielding or relief connection, which is set to "break" when a certain strain is reached and which comprises a sleeve 39 on one section of the link, said sleeve having exteriorly-located springs 40 attached thereto, and these springs carrying pins 41, which project through the sleeve and have beveled inner ends engaged in correspondingly-formed cavities in the other section of the link, said other section of the link fitting slidably within the sleeve 39 and having a transverse pin 42 fastened thereto and loosely fitted at its ends in longitudinal slots 43, formed in the sleeve 39. The engagement of the pins 41 with the inner link-section is sufficient to hold the two sections of the link rigidly engaged under all conditions of operation. However, should the load on the link become abnormal (which in practice might be due to the clogging of the machine) the pins 41 will be caused to jump out of the cavities in the inner link-section, and then the two sections of the link will slide the one on the other, and no movement will be transmitted beyond that section which is directly connected with the slide 36. Said link 38 is connected to a rod 44, which lies under the table of the machine and has its ends pivoted, respectively, to elbow-levers 45, said levers being suitably fulcrumed just above the table of the machine and working through cavities in the table. (See Fig. 3.) The upper ends of the elbow-levers 45 are connected by links 46 with the feeding-slides 47, said slides being of inverted-V shape (see the dotted lines in Fig. 5) and moving vertically in suitable guides 48, formed in the blank-hoppers 49. The limbs of the slides 47 are respectively adjacent to the feed-chutes to guide the blanks thereinto. Said hoppers 49 are two in number, located one at each end of the machine, and from each side of each hopper outwardly and downwardly extending blank-chutes 50 project. As the feed-slides 47 move downward in the guides 48 a number of nuts are engaged with the slides, and then as the slides move upward said blanks are rolled off at each side into the respective chutes 50, when the slides 47 reach a height sufficient to put the lower sides of the slides into positions opposite the mouths of the chutes 50. It will be observed that should any of the blanks clog in the hoppers, and thus prevent the proper action of the slides 47, the connection between the sections of the link 38 will collapse, and breakage of the machine is thereby prevented. As the link 38 moves backward or returns the pins 41 will reëngage the cavities in the inner link-section, and then the link will operate normally unless, however, the same or a second obstruction is met with, whereupon the connection will again collapse, as described. As the blanks fall through the chutes 50 they pass into position for engagement by the taps, and the mechanism for mounting and operating these parts of the machine will now be described.

Returning to the shaft 18, said shaft carries a pinion 51, which meshes with and drives an intermediate gear 52, rotatable on a stud 53ª, carried by the pedestals 16 just below the shaft 18. The gear 52 (see Fig. 6) is intermediate to two gears 53, with which latter gears said gear 52 meshes. These gears 53 being located at the respective sides of the machine are mounted to turn loosely on bushings 54, (see Fig. 4,) held fast in suitable bearings 55, sustained on the table of the machine. Passing loosely through the bushings 54 and disposed in parallelism longitudinally of the machine are two shafts 56, which are held in the said bushings to slide and to turn and which are provided with feed-screws 57, fastened to the shaft and working in stationary nuts 58, these nuts 58 being mounted on the table of the machine, as illustrated. Rotary movement imparted to the shafts 56 by mechanism which will be hereinafter described will result in a simultaneous longitudinal movement of said shafts, owing to the action of the parts 57 and 58, and it is clear that upon a reversal of this rotary movement the longitudinal movement will be correspondingly reversed.

At each end portion of each shaft 56 is located a transverse pin 59, similar in function to the pin 42 previously described. These pins 59 have their ends fitted loosely in slots 60, formed in sleeves 61, in which sleeves the ends of the shafts 56 are respectively fitted. Said sleeves 61 carry exteriorly springs 62, and said springs in turn sustain pins 63, which project transversely through the sleeves 61 and are formed with beveled ends engaging corresponding cavities in the end portions of the shafts 56. By these means connections are effected between the ends of the shafts 56 and the sleeves 61, said connections being rigid under normal conditions and breaking to permit independent movement of the parts under abnormal strains. To the sleeve 61, which is adjacent to the gear 53, a disk 64 is fastened, and said disk is formed with two or more openings therein, through which pass loosely studs 65, fastened to the gear 53. By these means and by means of the pins 59, fitting in the slots 60 of the sleeves 61, the rotative movements of the gears 53 are communicated to their respective shafts 56.

The outer ends of the sleeves 61 are mounted loosely in suitable boxes 66, sustained on the table of the machine, and outward from said boxes at the outer extremities of the sleeves are located the chucks for fastening in place the taps 67. Said chucks comprise collars 68, encircling the sleeves 61 and provided with screws 69 for holding the collars in place and also for holding within the sleeves the thimbles 70, which encircle the shanks of the taps. Said collars 68 also carry screws 71, which pass through openings in the sleeves 61 and in the thimbles 70 and directly engage the shanks of the taps. 72 indicates keys which are passed transversely through the sleeves 61 and thimbles 70 to hold said parts connected.

From the foregoing it will be apparent that as the shafts 56 are rotated they will be simultaneously moved longitudinally and that since the mechanism of the gears 53 are periodically reversed the shafts 56 will follow these reversals. Therefore the taps 67 are alternately moved into and retracted from the work, two taps being always active and two taps being always unscrewing from the finished nut.

Mounted on the table directly below the outer end of each sleeve 61 is a slide 73, these slides having upward extensions 73ª, through which the outer ends of the sleeves 61 pass loosely, and between said extensions 73ª and the boxes 66 expansive spiral springs 74 operate. Said springs tend to throw the slides outward, causing them to follow the outward movement of the adjacent collars 68, and as said collars move inward the slides 73 are forced to follow and the springs 74 are compressed. Attached to each slide 73 is an ejector 75, said ejectors being in the form of horizontally-disposed plates projected outward from the slides and capable of passing through the lower extensions 50ª of the chutes 50, these extensions forming the holders for the nuts while being tapped and being notched (see Fig. 5) to permit the free movement of the ejector-plates 75, as described. Said plates are formed with orifices 75ª in their inner portions, through which the nuts may drop. Assuming that the parts are in the position shown at the left-hand end of Fig. 4 and in Fig. 7 and that the shaft 56, with its attachments, is moving leftward, the bottommost nut has been tapped and lies on the imperforate outer portion of the ejector-plate 75. As the parts 67 and 75 continue their movement the former engages the lowermost blank, while the completed nut previously resting on the ejector-plate drops into the opening 75ª, the parts then assuming the position indicated at the right-hand end of Fig. 4. When the tap 67 finishes its operation and is withdrawn, the ejector-plate moves back correspondingly and the previously-finished nut is moved out of line with the chute and holder 50 and 50ª, whereupon said nut drops through the orifice 75ª, and as the tap leaves the just-finished nut the column of blanks falls upon the outer or imperforate portion of the ejector-plate. (See the left-hand end of Fig. 4.)

In connection with the ejection of the finished product reference should be had to Figs. 7 and 8. Fig. 7 shows the last-finished nut and the superimposed column of blanks resting on the ejector-plate 75 and the tap in position to engage the lowermost blank. In this connection it should be observed that the center of the tap is somewhat above the center of the lowermost blank, so that when said blank is engaged by the tap the entire column of blanks is slightly raised, as shown in Fig. 8. This leaves the last-finished nut free of all weight excepting its own, and therefore there is nothing to prevent its easy movement out of the lower portion of the holder 50ª. The machine being capable of operating both with square and hexagonal nuts, to accommodate these the ejector-plate is formed with a V-shaped groove 75ᵇ in its outer or imperforate portion. When a square nut is being operated upon, said nut lies with one side flat on the ejector-plate and bridges said groove 75ᵇ. This is indicated in Figs. 7 and 8. When, however, a hexagonal nut is operated on, the lowermost angle of the nut will enter the groove 75ᵇ, thus allowing the nut and the blank above it to assume then the proper position with respect to the tap. This is indicated in Fig. 10.

The finished nuts, falling through orifices in the table of the machine, enter inwardly-inclined chutes 76, said chutes having perforate bottoms 77, which allow the chips from the nut to fall into trays 78, provided therefor, while the nuts themselves are guided inward into a tray 79, located in the middle of the machine. Below the tray 79 is located an oil-reservoir 80, and from this reservoir a pipe 81 passes upward to a suitable pump 82, driven from a shaft and pulley located outside of the frame. A pipe 84 passes upward from the pump 82 and has two branches 85, passing, respectively, to the oil-fonts 86, which are located just inward of the blank-hoppers 49. From said fonts 86 drip-pipes 87 pass, these pipes being four in number, two for each font, and discharging directly over the respective taps, so as to supply the same with the oil necessary for the tapping operation. The tray 79 is formed with a perforate bottom, (see Fig. 6,) so that the oil accumulated on the nuts after the tapping operation may drain into the reservoir 80.

The general operation of the machine may be traced as follows: The hoppers 49 and the chutes 50 being filled with blanks, upon the operation of the pulley 21 the shaft 18 will be driven, and by the belt-shifting mechanism the movement of said shaft will be periodically reversed, thus reversing the gears 53 and causing the lever 34 to be given a regular rocking movement. The operation of the lever 34 results in the alternate rising and falling of the slides 47, and thus the chutes 50 are kept filled with blanks. The rotation of the gears 53 drives the shafts 56 simultaneously toward and from the ends of the machine, and by the operation before described the taps at one end of the machine are worked through the blanks, while at the other end of the machine they are being withdrawn. As the movement of the shafts 56 is reversed this order of operation also is reversed. Consequently the blanks being supplied with the necessary rapidity and being always presented to and removed from the path of the taps there is no operation of the machine intermediate the actual operation of the taps, these taps being driven through and withdrawn from the nuts without interruption, and owing to this fact the capacity of the machine is limited only by the speed at which it may be possible to operate the thread-cutting taps.

The modification shown in Figs. 11, 12, and 13 is a means whereby both of the shafts 56 and their four taps may be driven by a single lead-screw and whereby this screw may be placed and displaced at will, thus adapting the machine to many different screw pitches. The shafts 56 are engaged by the gears 53 to be rotated therefrom and to slide freely therein. The stub-shaft 53ª turns with the gear 52 and drives two spurs 88 and 89, to the latter of which is fastened the shaft 90, supporting it. Suitable devices on this gear 89 removably engage the lead-screw 91 to turn said screw. The opposite end of the screw is supported by a center or its equivalent 92. 94 indicates the nut, which is removably held in a yoke 93, this yoke being engaged with and carried by the shafts 56, so as to slide the shafts, but allow the free rotation thereof. The operation of this device will be apparent and it will also be seen that by removing the elements 91 and 94 others of different or any desired pitch may be placed in their stead.

Various changes in the form, proportions, and minor details of our invention may be resorted to at will without departing from the spirit and scope thereof. Hence we consider ourselves entitled to all such variations as may lie within the intent of our claims.

Having thus described our invention, we claim as new and desire to secure by Letters Patent—

1. In a tapping-machine, the combination of a revoluble and reciprocal shaft, a lead-screw and nut coacting therewith for the purpose specified, a gear mounted to turn loosely around the axis of the shaft, means for reversely rotating the gear, a sleeve slidably mounted on one end of the shaft, a slidable connection between the sleeve and gear, means for yieldingly holding the sleeve against said sliding movement, and a tool carried by the sleeve.

2. In a tapping-machine, the combination of a revoluble and reciprocal shaft, a lead-screw and nut coacting therewith for the purpose specified, a gear mounted to turn loosely around the axis of the shaft, means for reversely rotating the gear, a sleeve slidably mounted on one end of the shaft, a slidable connection between the sleeve and gear, means for yieldingly holding the sleeve against said sliding movement, a tool carried by the sleeve, a second sleeve slidably mounted on the other end of the shaft, means for yieldingly holding the second-named sleeve against said sliding movement, and a tool carried by the second-named sleeve.

3. In a tapping-machine, the combination of a revoluble and reciprocal shaft, a lead-screw and nut coacting therewith, for the purpose specified, a reversibly-driven rotating gear mounted axially coincident to said shaft, a sleeve mounted to slide on and to turn with the shaft, means for yieldingly holding the sleeve against said sliding movement, a tool carried by the sleeve, a member connected with and projecting laterally from the sleeve, and a stud carried by the said gear and sliding in the said projected member.

4. In a tapping-machine, the combination of a revoluble and reciprocal shaft, a lead-screw and nut coacting therewith for the purpose specified, a reversely-driven rotary gear axially coincident to the shaft, a sleeve mounted on the shaft, a pin carried transversely by the shaft, said sleeve having a longitudinal slot receiving the pin and allowing the sleeve longitudinal movement on the shaft, a disk attached to the sleeve, studs carried by the gear and fitted loosely in the disk, means for yieldingly holding the sleeve against said independent sliding movement, and a tool connected with the sleeve.

5. In a tapping-machine, the combination of a revoluble and reciprocal shaft, a lead-screw and nut coacting therewith for the purpose specified, a reversely-driven rotary gear axially coincident to the shaft, a sleeve mounted on the shaft, a pin carried transversely by the shaft, said sleeve having a longitudinal slot receiving the pin and allowing the sleeve longitudinal movement on the shaft, a disk attached to the sleeve, studs carried by the gear and fitted loosely in the disk, means for yieldingly holding the sleeve against said independent sliding movement, and a tool connected with the sleeve, said means for yieldingly holding the sleeve against its sliding movement comprising a spring-sustained pin carried in the sleeve and engaging a cavity in the shaft.

6. In a tapping-machine, the combination of a revoluble and reciprocal shaft, a lead-screw and nut coacting therewith for the purpose specified, means for imparting a rotary movement to the shaft independent of the reciprocal movement thereof, a sleeve mounted on each end of the shaft, each sleeve having a longitudinal slot therein, a transverse pin carried by each end portion of the shaft and respectively fitted in the slots of the sleeves, and a yieldingly-sustained pin carried by each sleeve, said pins fitting in cavities in the shaft to yieldingly hold the sleeves against sliding on the shaft.

7. In a nut-tapping machine, the combination with the framing and a vertically-extending feed-chute, of means for mounting and operating the tap, said means comprising a reciprocal and revoluble shaft, a slide mounted on the framing of the machine and having sliding connection with the shaft, a spring yieldingly holding the slide to move with the shaft, said slide engaging a part of the framing as the tap moves into inactive position and said spring being compressed during its engagement, and an ejector attached to the slide and coacting with the tap, substantially as described.

8. The combination of a revoluble and reciprocal tool-carrying member, means for feeding the same, a reversely-driven gear axially coincident to said member, a sleeve mounted on the member, a pin carried transversely by the member, the sleeve having a longitudinal slot receiving the pin and allowing the sleeve longitudinal movement on the shaft, a disk attached to the sleeve, a stud carried by the gear and fitted loosely in the disk, and means for yieldingly holding the sleeve against said independent sliding movement.

9. The combination of a revoluble and reciprocal tool-carrying member, means for feeding the same, a reversely-driven gear axially coincident to said member, a sleeve mounted on the member, a pin carried transversely by the member, the sleeve having a longitudinal slot receiving the pin and allowing the sleeve longitudinal movement on the shaft, a disk attached to the sleeve, a stud carried by the gear and fitted loosely in the disk, and means for yieldingly holding the sleeve against said independent sliding movement, said means for yieldingly holding the sleeve against its sliding movement comprising a spring-sustained pin carried by the sleeve and engaging a cavity in the said tool-carrying member.

10. In a nut-tapping machine, the combination with the framing and the work-holding means, of means for mounting and operating the tap, said means comprising a reciprocal and revoluble member, a slide mounted on the framing and having sliding connection with said reciprocal and revoluble member, a spring coacting with the slide and said member yieldingly to connect the two, and an ejector attached to the slide and coacting with the tap and work-holding means.

11. In a tapping-machine, the combination with the frame, of a revoluble and reciprocal shaft, a reversely-driven gear mounted to turn freely around the axis of the shaft, a sleeve mounted to slide but not to turn on the shaft, a pin carried by said gear, means establishing sliding connection between the pin and sleeve, a tap carried by the sleeve, means for yieldingly restraining the sliding movement of the sleeve, and means for feeding the shaft simultaneously with the rotary movement thereof.

12. In a tapping-machine, the combination of two revoluble and reciprocal tool-carrying members, means for rotating the same, a yoke extending between and connected with said members to impart reciprocal movement thereto, a nut carried by the yoke, a screw engaged with the nut, and means for rotating the screw.

13. In a tapping-machine, the combination with the frame, of two revoluble and reciprocal tool-carrying members, means for rotating the same, a yoke extending between and connected with said members to reciprocate them, a nut, a screw engaged therewith, one of the two last-named elements being carried by the yoke, and the other sustained independently thereof, and means for rotating said other one of said elements.

14. In a tapping-machine, the combination with a frame, of two revoluble and reciprocal tool-carrying members, means for rotating the same, a yoke extending transversely between said members and loosely connected therewith to impart reciprocal movement thereto, and means acting on the yoke intermediate its ends for bodily moving the same, whereby to impart said reciprocal movement.

15. In a tapping-machine, the combination of a revoluble and reciprocal tool-carrying member, means for revolving the same, a part loosely engaged with said member to reciprocate it, a nut removably carried by said part, a screw, means for revolubly mounting the screw, and means for revolubly driving it, the said means for mounting the screw comprising releasable parts whereby to permit the removal and substitution of the screw.

16. In a tapping-machine, the combination of two revoluble and reciprocal tool-carrying members, a yoke loosely engaged therewith and extending between the same, a nut carried by the yoke, an independently-mounted screw coacting with the nut, a gear in connection with the screw, a drive-shaft, a gear thereon and meshed with the gear connected with the screw, a second gear on the drive-shaft, and a gear splined on each of said tool-carrying members and meshed with the second gear on the drive-shaft.

17. The combination of two revoluble and reciprocally-mounted tool-carrying members, a yoke extending between the same and loosely engaged therewith, a nut carried by the yoke, a screw engaged with the nut, a revoluble shaft, a gear carried thereby, means for connecting one end of the screw and the gear to turn the screw from the gear, a center engaging the opposite end of the screw, a driven shaft, a gear thereon meshed with the first-named gear, a second gear on the driven shaft, and gears splined on the tool-carrying members and respectively meshed with the second gear on the driven shaft.

18. In a tapping-machine, the combination with the frame of a revoluble and reciprocal shaft, a reversely-driven gear mounted to turn freely around the axis of the shaft, a tool-carrying member arranged to slide on the shaft and to turn therewith, means establishing a sliding connection between said member and the reversely-driven gear, means for yieldingly restraining the independent sliding movement of the said member, and means for feeding the shaft simultaneously with the rotary movement thereof.

In testimony whereof we have signed our names to this specification in the presence of two subscribing witnesses.

GEORGE F. ZWILLING.
CHARLES W. RICHARDS.

Witnesses:
KATHERINE L. SMITH,
A. J. MILLER.